(12) United States Patent
Misra et al.

(10) Patent No.: US 11,989,210 B2
(45) Date of Patent: May 21, 2024

(54) PROVIDING ENERGY EFFICIENT DYNAMIC REDUNDANCY ELIMINATION FOR STORED DATA

(71) Applicant: Accenture Global Solutions Limited, Dublin (IE)

(72) Inventors: Janardan Misra, Bangalore (IN); Naveen Gordhan Balani, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 3 days.

(21) Appl. No.: 17/812,028

(22) Filed: Jul. 12, 2022

(65) Prior Publication Data
US 2024/0020317 A1    Jan. 18, 2024

(51) Int. Cl.
G06F 7/00    (2006.01)
G06F 16/215    (2019.01)
G06F 16/28    (2019.01)

(52) U.S. Cl.
CPC .......... *G06F 16/285* (2019.01); *G06F 16/215* (2019.01)

(58) Field of Classification Search
CPC ...... G06F 16/285; G06F 16/245; G06N 20/00
USPC .................................. 707/600–899
See application file for complete search history.

(56) References Cited

U.S. PATENT DOCUMENTS 8,074,043 B1 *   12/2011   Zeis ..................... G06F 11/1453
                                              711/171

OTHER PUBLICATIONS

Xia et al., "A Comprehensive Study of the Past, Present, and Future of Data Deduplication," Proceedings of the IEEE, 2016, 31 Pages.
Weis et al., "Industry-Scale Duplicate Detection," Proceedings of the VLDB Endowment 1.2, Aug. 24-30, 2008, 12 Pages.

* cited by examiner

*Primary Examiner* — Isaac M Woo
(74) *Attorney, Agent, or Firm* — Harrity & Harrity, LLP

(57) ABSTRACT

A device may identify unique segments within data objects, of an object corpus stored in a data structure, as elements, and may generate an embedding space based on unique elements and mappings of the data objects to embeddings. The device may estimate semantic proximities among the data objects based on the mappings, and may build a semantic cohesion network among the data objects based on the semantic proximities. The device may identify semantically cohesive data clusters in the semantic cohesion network, and may sort the data objects in the semantically cohesive data clusters. The device may determine, from the semantically cohesive and sorted data clusters, a home data cluster for a new data object, and may store bookkeeping details of the new data object in the data structure based on the new data object being semantically similar to the data object in the home data cluster.

20 Claims, 11 Drawing Sheets

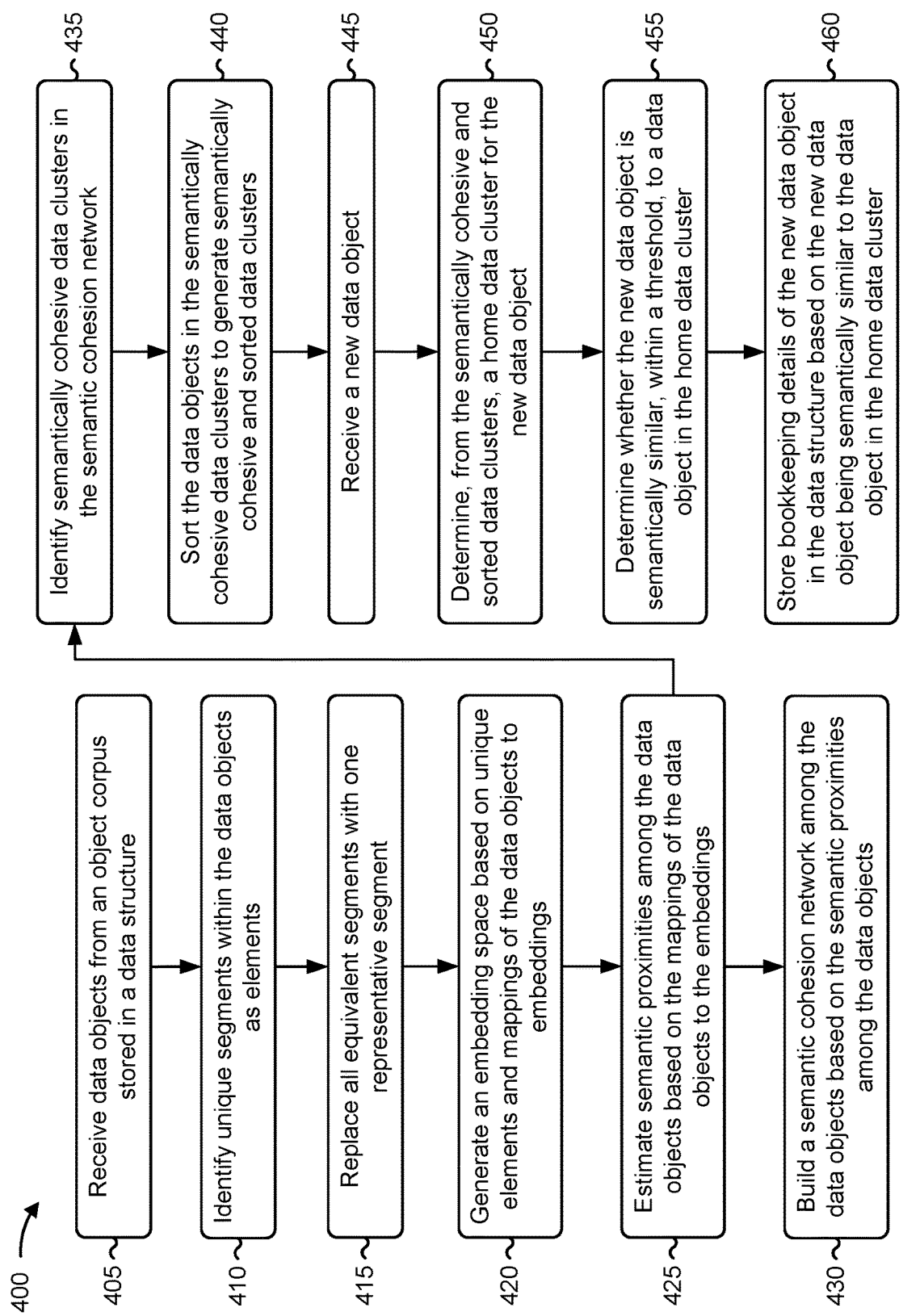

PROVIDING ENERGY EFFICIENT DYNAMIC REDUNDANCY ELIMINATION FOR STORED DATA

BACKGROUND

Software applications may generate and/or store data in data structures (e.g., databases, tables, lists, and/or the like). Carbon emissions generated by a process of managing and storing data in data structures is a major contributing factor in overall energy costs of maintaining software applications across industries.

SUMMARY

Some implementations described herein relate to a method. The method may include receiving data objects from an object corpus stored in a data structure, and identifying unique segments within the data objects as elements. The method may include replacing all equivalent segments with one representative segment, and generating an embedding space based on unique elements and mappings of the data objects to embeddings. The method may include estimating semantic proximities among the data objects based on the mappings of the data objects to the embeddings, and building a semantic cohesion network among the data objects based on the semantic proximities among the data objects. The method may include identifying semantically cohesive data clusters in the semantic cohesion network, and sorting the data objects in the semantically cohesive data clusters to generate semantically cohesive and sorted data clusters. The method may include receiving a new data object, and determining, from the semantically cohesive and sorted data clusters, a home data cluster for the new data object. The method may include determining whether the new data object is semantically similar, within a threshold, to a data object in the home data cluster, and storing bookkeeping details of the new data object in the data structure based on the new data object being semantically similar to the data object in the home data cluster.

Some implementations described herein relate to a device. The device may include one or more memories and one or more processors coupled to the one or more memories. The one or more processors may be configured to receive data objects from an object corpus stored in a data structure, and identify unique segments within the data objects as elements. The one or more processors may be configured to replace all equivalent segments with one representative segment, and generate an embedding space based on unique elements and mappings of the data objects to embeddings. The one or more processors may be configured to estimate semantic proximities among the data objects based on the mappings of the data objects to the embeddings, and build a semantic cohesion network among the data objects based on the semantic proximities among the data objects. The semantic cohesion network may include a set of nodes corresponding to the data objects, links between the set of nodes that are based on the semantic proximities among the data objects, and weights associated with the links. The one or more processors may be configured to identify semantically cohesive data clusters in the semantic cohesion network, and sort the data objects in the semantically cohesive data clusters to generate semantically cohesive and sorted data clusters. The one or more processors may be configured to receive a new data object, and determine, from the semantically cohesive and sorted data clusters, a home data cluster for the new data object. The one or more processors may be configured to determine whether the new data object is semantically similar, within a threshold, to a data object in the home data cluster, and store bookkeeping details of the new data object in the data structure based on the new data object being semantically similar to the data object in the home data cluster.

Some implementations described herein relate to a non-transitory computer-readable medium that stores a set of instructions for a device. The set of instructions, when executed by one or more processors of the device, may cause the device to receive data objects from an object corpus stored in a data structure, and identify unique segments within the data objects as elements. The set of instructions, when executed by one or more processors of the device, may cause the device to replace all equivalent segments with one representative segment, and generate an embedding space based on unique elements and mappings of the data objects to embeddings. The set of instructions, when executed by one or more processors of the device, may cause the device to estimate semantic proximities among the data objects based on the mappings of the data objects to the embeddings, and build a semantic cohesion network among the data objects based on the semantic proximities among the data objects. The set of instructions, when executed by one or more processors of the device, may cause the device to identify semantically cohesive data clusters in the semantic cohesion network, and sort the data objects in the semantically cohesive data clusters to generate semantically cohesive and sorted data clusters. The set of instructions, when executed by one or more processors of the device, may cause the device to receive a new data object, and determine, from the semantically cohesive and sorted data clusters, a home data cluster for the new data object. The set of instructions, when executed by one or more processors of the device, may cause the device to determine whether the new data object is semantically similar, within a threshold, to a data object in the home data cluster, and selectively store bookkeeping details of the new data object in the data structure based on the new data object being semantically similar to the data object in the home data cluster, or prevent the new data object from being stored in the data structure based on the new data object being semantically similar to the data object in the home data cluster.

BRIEF DESCRIPTION OF THE DRAWINGS

FIG. 4 is a flowchart of an example process for providing energy efficient dynamic redundancy elimination for stored data.

DETAILED DESCRIPTION

Figure 1A:
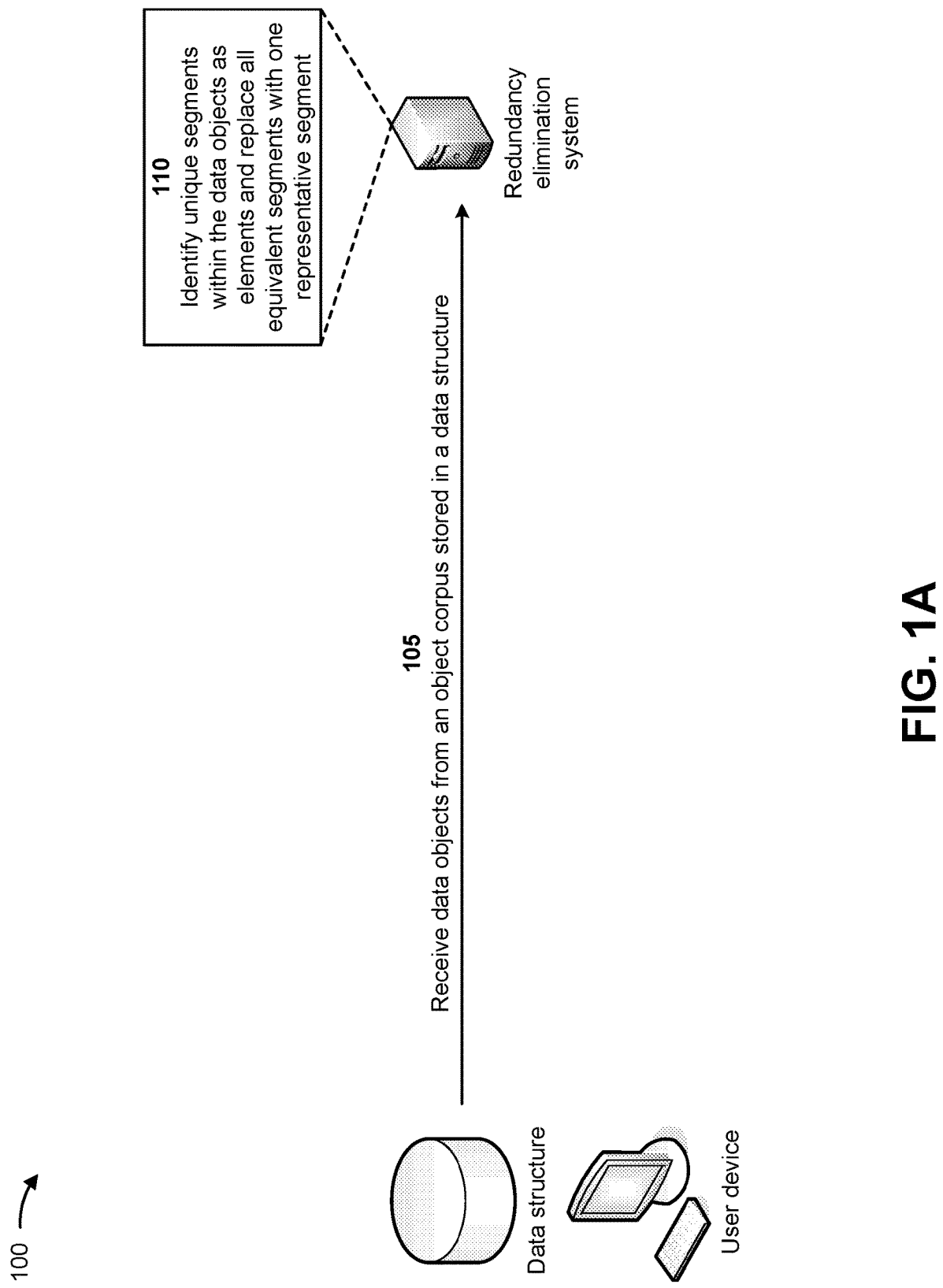
FIGS. 1A-1H are diagrams of an example implementation described herein.

The following detailed description of example implementations refers to the accompanying drawings. The same reference numbers in different drawings may identify the same or similar elements.

A majority of data stored in data structures fails to provide practically useful insights without application of resource intensive analytics of the data. Therefore, storage and management of such data in data structures is increasingly becoming an overhead with high computational and energy costs. Current techniques for storing data focus on removal of redundant data via database deduplication techniques (e.g., that operate at a level of meta-characteristics of data objects for identifying duplicates by matching size, type, modification date, and/or the like), compression of data objects for specific data types (e.g., audio encoding techniques), generic compression techniques (e.g., that operate at syntactic levels by identifying repeated byte sequences in a file), and/or the like. However, such techniques fail to provide optimal data redundancy removal and optimal compression of data structures. Therefore, current techniques for storing data consume computing resources (e.g., processing resources, memory resources, communication resources, and/or the like), networking resources, and/or the like associated with performing data analytics on large data structures with redundant data, unnecessarily storing large quantities of redundant data in data structures, unnecessarily storing large quantities of useless data in data structures, integrating data in data structures, and/or the like.

Some implementations described herein relate to a redundancy elimination system that provides energy efficient dynamic redundancy elimination for stored data. For example, the redundancy elimination system may receive data objects from an object corpus stored in a data structure, and may identify unique segments within the data objects as elements. The redundancy elimination system may replace all equivalent segments with one representative segment, and may generate an embedding space based on unique elements and mappings of the data objects to embeddings. The redundancy elimination system may estimate semantic proximities among the data objects based on the mappings of the data objects to the embeddings, and may build a semantic cohesion network among the data objects based on the semantic proximities among the data objects. The redundancy elimination system may identify semantically cohesive data clusters in the semantic cohesion network, and may sort the data objects in the semantically cohesive data clusters to generate semantically cohesive and sorted data clusters. The redundancy elimination system may receive a new data object, and may determine, from the semantically cohesive and sorted data clusters, a home data cluster for the new data object. The redundancy elimination system may determine whether the new data object is semantically similar, within a threshold, to a data object in the home data cluster, and may store bookkeeping details of the new data object in the data structure based on the new data object being semantically similar to the data object in the home data cluster.

In this way, the redundancy elimination system provides energy efficient dynamic redundancy elimination for stored data. The redundancy elimination system may dynamically identify semantically redundant data objects as the data objects are generated and are received for storage. By efficiently identifying redundancies in the data objects, the redundancy elimination system may provide energy cost savings by a factor of at least two relative to the current techniques. The redundancy elimination system may identify redundancies in the data objects based on semantic matching at a level of constituent elements of the data objects (e.g., unique phrases in a text document and relative information contained in those phrases). The redundancy elimination system may semantically compress a data structure as an element matrix by storing data objects in terms of constituent elements and information content of the data objects. This, in turn, conserves computing resources, networking resources, and/or the like that would otherwise have been consumed in performing data analytics on large data structures with redundant data, unnecessarily storing large quantities of redundant data in data structures, unnecessarily storing large quantities of useless data in data structures, integrating data in data structures, and/or the like.

FIGS. 1A-1H are diagrams of an example 100 associated with providing energy efficient dynamic redundancy elimination for stored data. As shown in FIGS. 1A-1H, example 100 includes a redundancy elimination system associated with a user device and a data structure. The redundancy elimination system may include a system that provides energy efficient dynamic redundancy elimination for stored data. Further details of the redundancy elimination system, the user device, and the data structure are provided elsewhere herein.

As shown in FIG. 1A, and by reference number 105, the redundancy elimination system may receive data objects from an object corpus stored in a data structure. For example, the data structure may store the data objects of the object corpus. The data objects may include data objects generated by software applications and/or stored by the software applications in the data structure. The redundancy elimination system may continuously receive the data objects from the data structure, may periodically receive the data objects from the data structure, may receive the data objects based on providing a request to the data structure, and/or the like. A data object may include a region of storage that contains a value or a group of values. Each value may be accessed using an identifier or a more complex expression that refers to the data object. The data objects may include unique identifiers, data types, and attributes. In this way, the data objects may vary across data structures and different programming languages.

As further shown in FIG. 1A, and by reference number 110, the redundancy elimination system may identify unique segments within the data objects as elements and may replace all equivalent segments with one representative segment. For example, the redundancy elimination system may identify the unique segments within the data objects as the elements based on data types associated with the data objects. In some implementations, if a data object is a text document, the redundancy elimination system may identify the unique segments within the data objects as words or phrases; if a data object is an image, the redundancy elimination system may identify the unique segments within the data objects as various identified objects within the image; if a data object is a record, the redundancy elimination system may identify the unique segments within the data objects as fields; if a data object is an audio file, the redundancy elimination system may identify the unique segments within the data objects as different types of sound patterns, such as speech, music, background noise, silence, and/or the like; if a data object is a complex data type (e.g., an extensible markup language (XML) file, the redundancy elimination system may identify the unique segments within the data objects as constituent elements in the schema; and/or the like.

In some implementations, the redundancy elimination system may replace all equivalent segments (e.g., elements) with one representative segment in the entire object corpus. For example, for textual data objects, the equivalent segments (e.g., which may be replaced with one representative segment) may include linguistic variants, abbreviations (e.g., "IP" and "Intellectual Property"), domain equivalent terms (e.g., "smartcard" and "Scard"), lexical equivalents or synonyms (e.g., "goal" and "objective"), and/or the like. For image data objects, the equivalent segments (e.g., which may be replaced with one representative segment) may include images of the same objects with surface level variations.

Figure 1B:
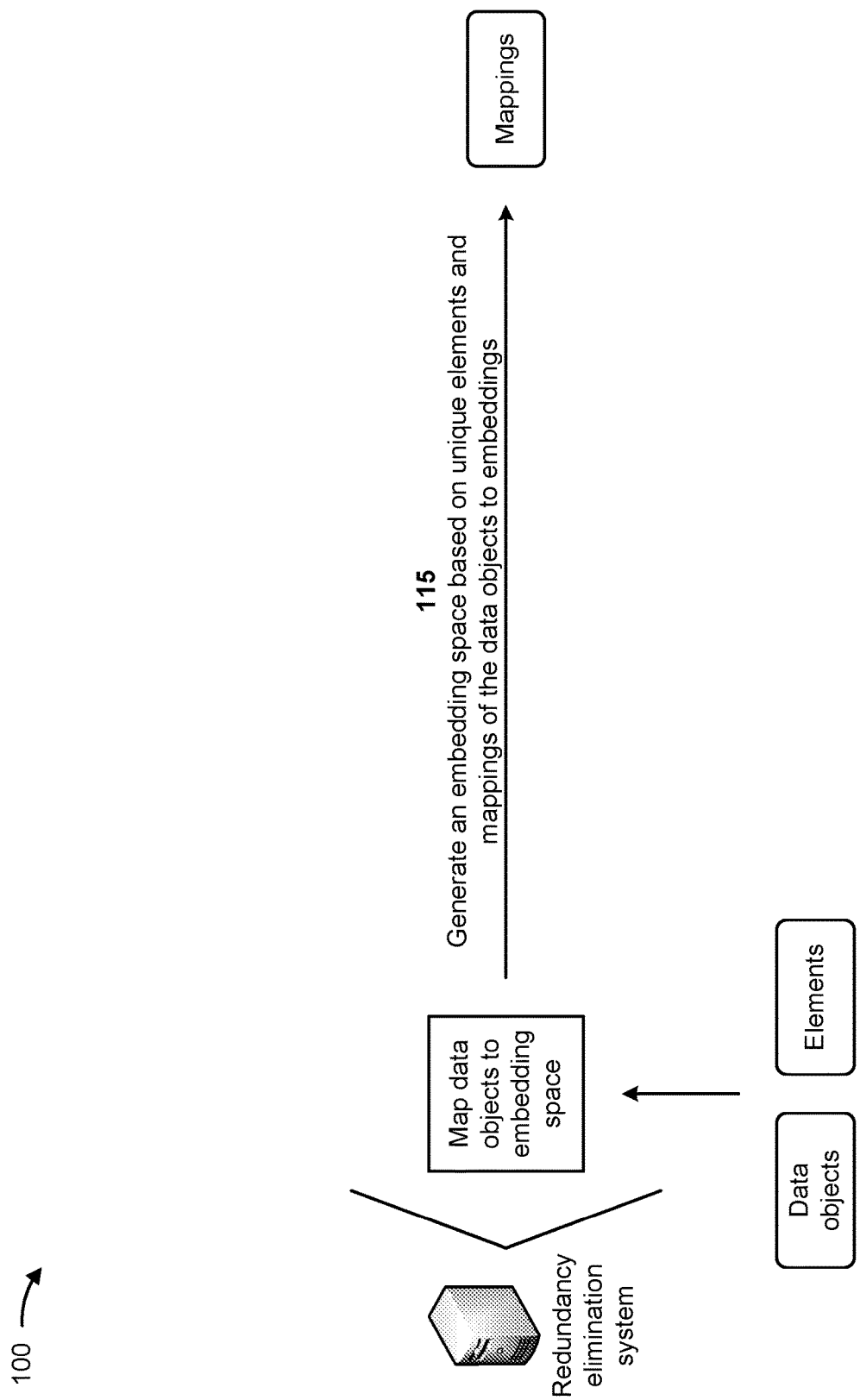

As shown in FIG. 1B, and by reference number 115, the redundancy elimination system may generate an embedding space based on unique elements and mappings of the data objects to embeddings. For example, the redundancy elimination system may estimate an information theoretic significance for each element within a data object of the object corpus using a technique, such as BM25. BM25 is a ranking function used by search engines to estimate a relevance of a document to a given search query. For example, bm25(w) may be the information theoretic significance for an element w. The redundancy elimination system may build embeddings of unique elements within the object corpus (e.g., by applying a word2vec model or a Glove model for textual data object). For example, e(w) may be an embedding for the element w. The redundancy elimination system may transform each embedding using an information theoretic significance of the element associated with each embedding, as follows:

$e(w) \leftarrow bm25(w)*e(w)$

In some implementations, when generating the embedding space, the redundancy elimination system may generate embeddings of the data objects. For example, for each data object A in the object corpus, the redundancy elimination system may map the data object A into the embedding space based on embeddings of constituent elements of the data object A, as follows:

$$e(A) = \frac{\Sigma_{w \in A} n_w * e(w)}{|A|},$$

where $|A|$ corresponds to a total quantity of elements in the data object A and $n_w$ corresponds to a quantity of times that the element w appears in the object A.

Figure 1C:
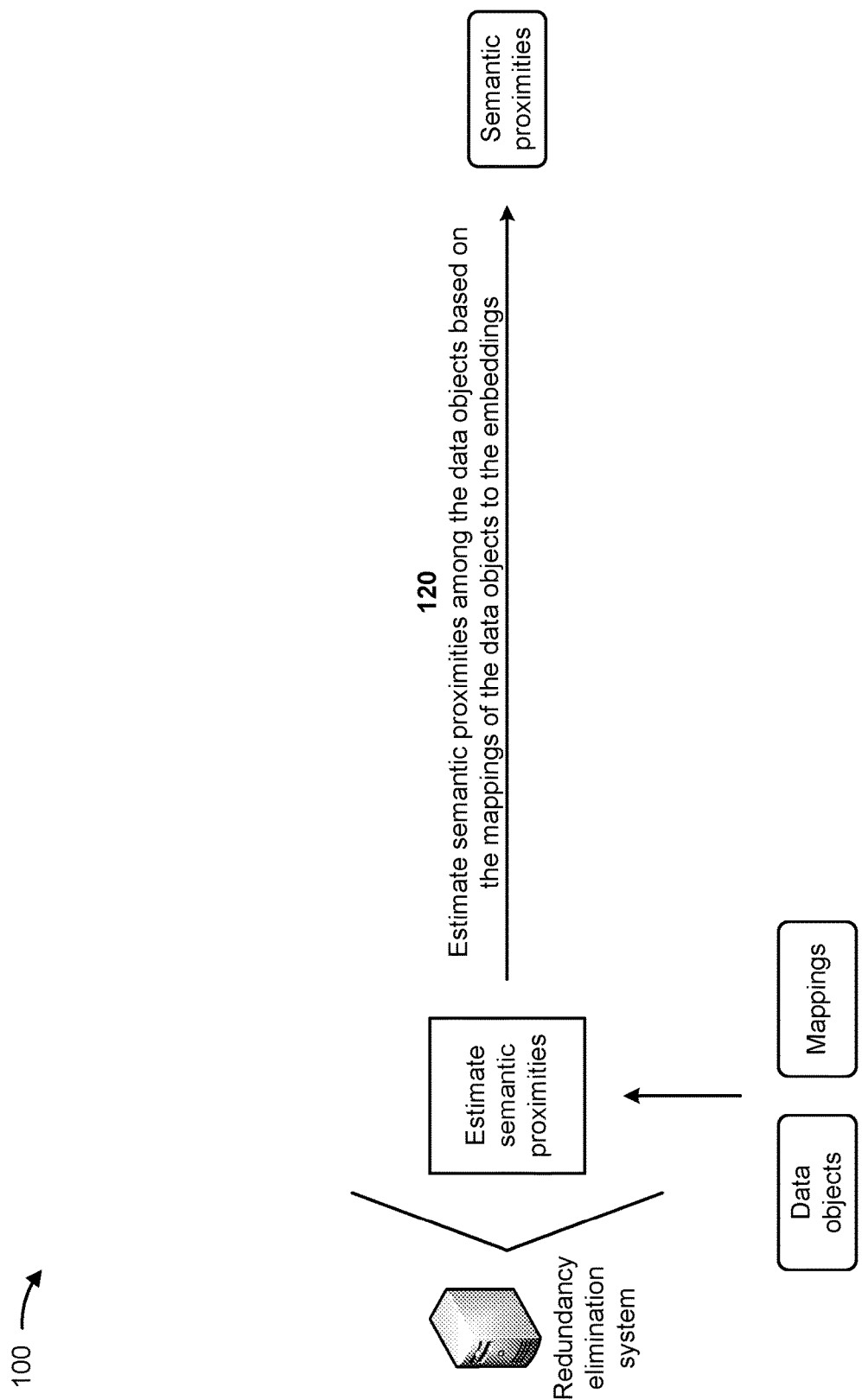

As shown in FIG. 1C, and by reference number 120, the redundancy elimination system may estimate semantic proximities among the data objects based on the mappings of the data objects to the embeddings. For example, the redundancy elimination system may measure the semantic proximities among the data objects based on the mappings of the data objects to the embeddings. In some implementations, two data objects $A_1$ and $A_2$ in the object corpus may include mappings to the embedding space as $e(A_1)$ and $e(A_2)$. The redundancy elimination system may estimate a semantic proximity between data objects $A_1$ and $A_2$ as:

$$senCh(A_1, A_2) = \frac{\Sigma_i e(A_1)[i] * e(A_2)[i]}{\sqrt{\Sigma_i e(A_1)[i]^2} \sqrt{\Sigma_i e(A_2)[i]^2}}.$$

In some implementations, the redundancy elimination system may estimate the semantic proximities among different data types of the data objects. For example, if data objects $A_1$ and $A_2$ are numeric data types, the redundancy elimination system may estimate the semantic proximity between the data objects $A_1$ and $A_2$ based on an absolute difference between values of the data objects:

$semCh(A_1,A_2)=|A_1-A_2|.$

If data objects $A_1$ and $A_2$ are categorical data types, the redundancy elimination system may estimate the semantic proximity between the data objects $A_1$ and $A_2$ based on whether the data objects are the same or are different:

$$semCh(A_1, A_2) = \begin{cases} 1 \text{ if } A_1 = A_2 \\ 0 \text{ otherwise} \end{cases}.$$

If data objects $A_1$ and $A_2$ are composite data types (e.g., records with identical schema of $n \geq 1$ fields, where each field is a basic data type), the redundancy elimination system may estimate the semantic proximity between the data objects $A_1$ and $A_2$ as follows:

$semCh(A_1,A_2)=\sqrt{\Sigma_{i \in 1...n}(A_1[i]-A_2[i])^2}.$

Figure 1D:
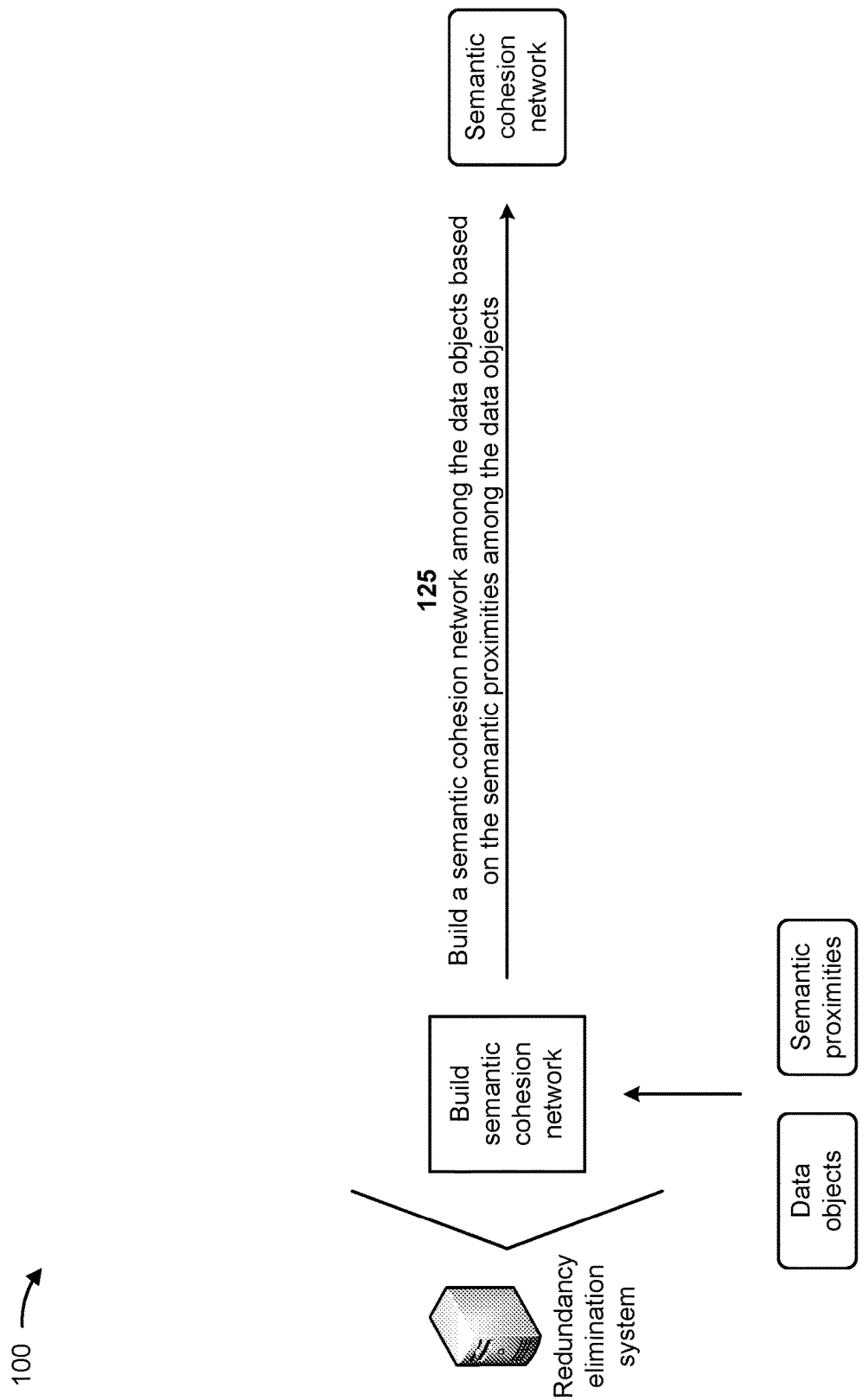

As shown in FIG. 1D, and by reference number 125, the redundancy elimination system may build a semantic cohesion network among the data objects based on the semantic proximities among the data objects. For example, the redundancy elimination system may build the semantic cohesion network ($G_{DB}$), among the data objects of the object corpus, based on the semantic proximities among the data objects and according to the equation $G_{DB}=(V_{DB}, E_{DB}, \text{bonding})$. $V_{DB}$ may include a set of nodes corresponding to the data objects, such that node $v_i$ may correspond to data object $A_1$. $E_{DB} \subseteq V_{DB} \times V_{DB}$ may include a set of undirected links between a pair of nodes having a semantic proximity $\geq \vartheta$, where $\vartheta$ may correspond to a threshold parameter (e.g., 0.75, 0.80, 0.85, and/or the like). The bonding (e.g., $E_{DB} \mapsto [\vartheta, 1]$) may include a function that associates weights with edges, such that for all $e=(v_1, v_2) \in E_{smaDB}$: bonding$(v_1, v_2)=$semCh$(A_1, A_2)$.

Figure 1E:
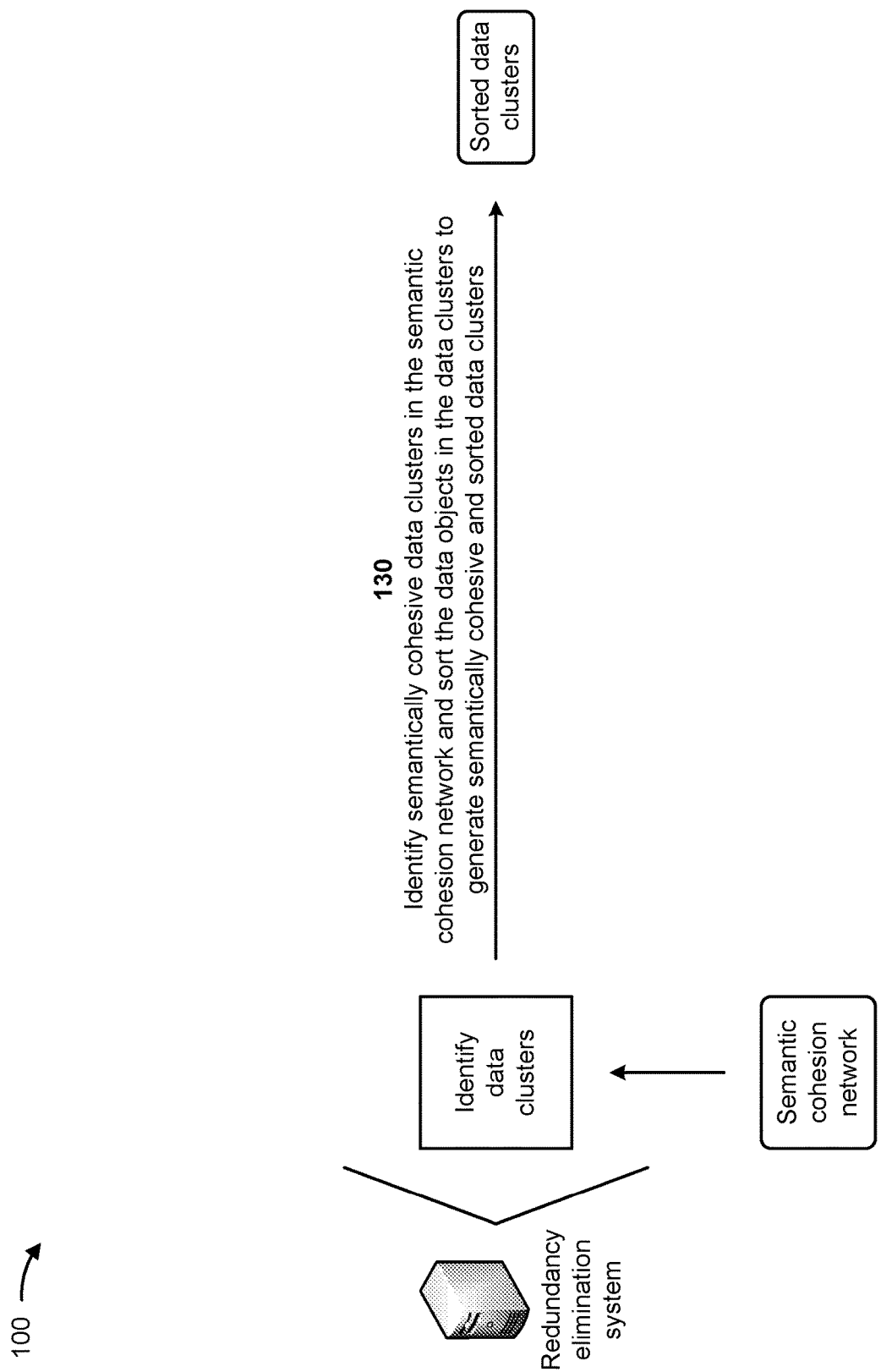

As shown in FIG. 1E, and by reference number 130, the redundancy elimination system may identify semantically cohesive data clusters in the semantic cohesion network and may sort the data objects in the data clusters to generate semantically cohesive and sorted data clusters. For example, if $\Phi=2^{V_{DB}}$ is a power set of the set of nodes ($V_{DB}$) and subsets, the redundancy elimination system may remove, from the power set $\Phi$, the subsets of nodes where at least one pair of nodes is not connected to each other, as follows: $\Phi'=\Phi\backslash\{V \subseteq V_{DB} \neg \exists v, v' \in V \text{ s.t. } (v, v') \notin E_{DB}\}$. The redundancy elimination system may remove, from $\Phi'$, the subsets of nodes that are included in any other subset in $\Phi'$, as follows: $\Phi''=\Phi'\backslash\{V \in \Phi' \neg \exists V' \in \Phi' \text{ s.t. } V \subset V'\}$. In this way, the redundancy elimination system may identify maximal groups of the data objects, such that data objects within each group are strongly semantically and cohesively connected to each other and such that the groups include maximum possible data objects (e.g., if a new data object is added to a group, the group may not remain semantically cohesive for at least one of the existing data objects in the group). $\Phi''$ may represent these maximal groups of data objects (e.g., referred to as data clusters) as $\Phi''=\{C_1, \ldots, C_k\}$.

In some implementations, for each data cluster $C \in \Phi''$, the redundancy elimination system may sort the data objects in the data cluster relative to a quantity of distinct constituent elements that includes the data objects. For example, the redundancy elimination system may sort text files based upon different phrases appearing in each text file. Such intra-cluster sorting of the data objects may reduce a time required by the redundancy elimination system to detect an identical data object when a new data object is received, as described below.

Figure 1F:
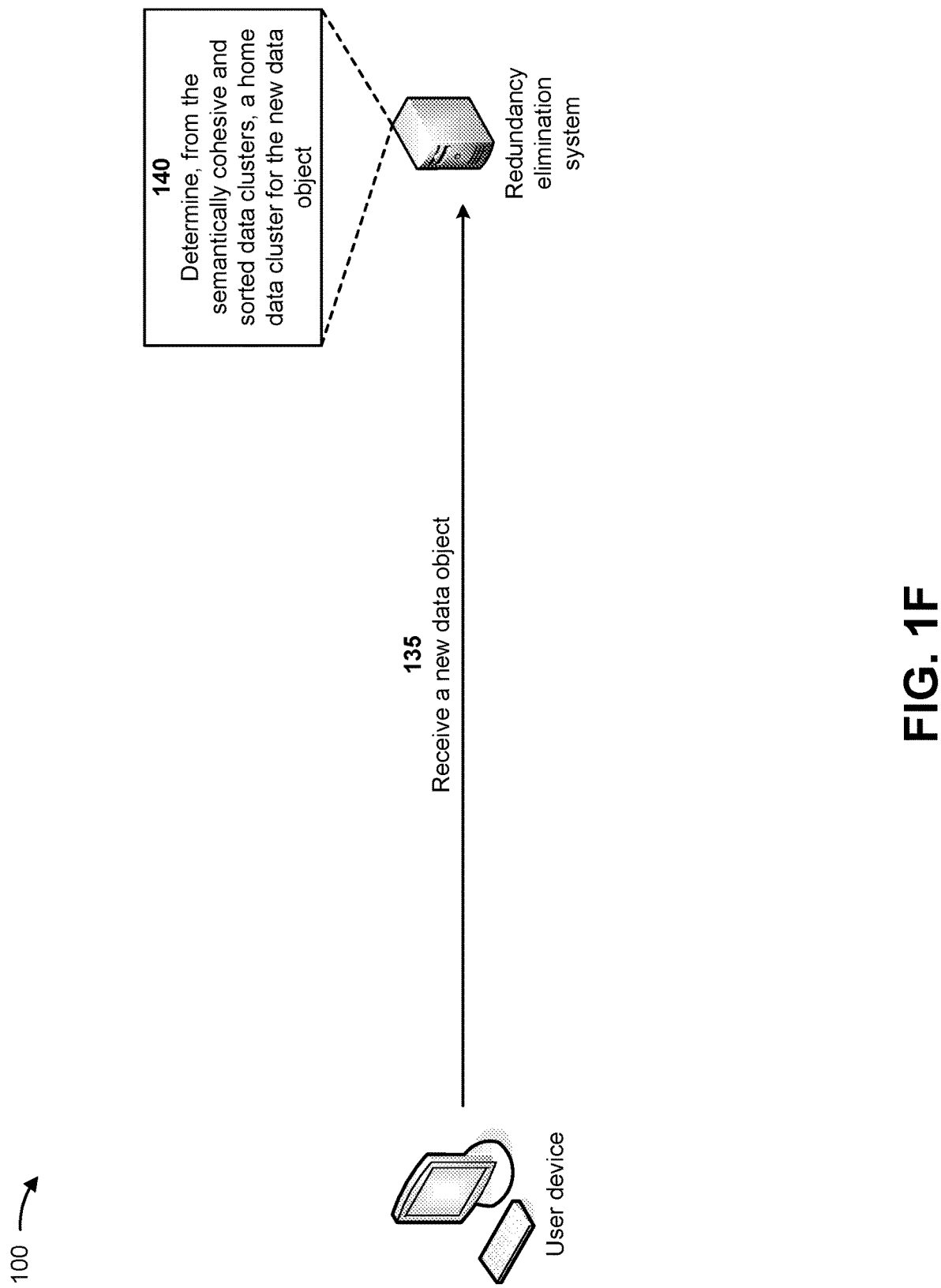

As shown in FIG. 1F, and by reference number 135, the redundancy elimination system may receive a new data object. For example, a software application executing on the user device may generate the new data object. The user device may provide the new data object to the redundancy elimination system, and the redundancy elimination system may receive the new data object from the user device. The new data object may include a region of storage that contains a value or a group of values.

As further shown in FIG. 1F, and by reference number 140, the redundancy elimination system may determine, from the semantically cohesive and sorted data clusters, a home data cluster for the new data object. For example, when the new data object is received, the redundancy elimination system may identify the home data cluster ($C_{home}$) for the new data object. The home data cluster may be a data cluster of data objects with a maximum proximity with the new data object ($o_{new}$). In this way, the redundancy elimination system may ensure computational resource optimization, in contrast to current techniques for deduplication (e.g., which estimate a distance of the new data object from all data objects in the object corpus to determine whether the new data object is a duplicate).

In some implementations, when determining the home data cluster for the new data object, the redundancy elimination system may determine cluster centroids for the data clusters. For example, for each data cluster $C_i \in \Phi''$, the redundancy elimination system may initialize a centroid distance and a centroid of the data cluster: $\pi_i = \infty$//centroid distance (e.g., where $\infty$ is a very large number) and centroid ($C_i$)=$\emptyset$//empty set. For each data object in the data cluster (e.g., $d \in C_i$), the redundancy elimination system may estimate the data cluster centroid as follows:

$$dis_{mean}(d, C_i) = \frac{1}{|C_i|} \sum_{d' \in C_i, d' \neq d} bonding(d, d')$$

if $(dis_{mean}(d, C_i) < \pi_i)$, $\pi_i \leftarrow dis_{mean}(d, C_i)$, and centroid($C_i$) $\leftarrow d$.

When determining the home data cluster for the new data object, the redundancy elimination system may, for each data cluster $C_i \in \Phi''$, initialize a proximity with a current home data cluster and the current home data cluster: $\theta = \infty$//proximity with current home data cluster and home($o_{new}$)= $\emptyset$//empty set. For each data cluster (e.g., $C_i \in \Phi''$), the redundancy elimination system may determine the home data cluster for the new data object as follows:

dis($o_{new}, C_i$)=semCh($o_{new}$,centroid($C_i$))

if (dis($o_{new}, C_i$)<$\theta$), $\theta \leftarrow$dis($o_{new}, C_i$), and home($o_{new}$)$\leftarrow C_i$.

Figure 1G:
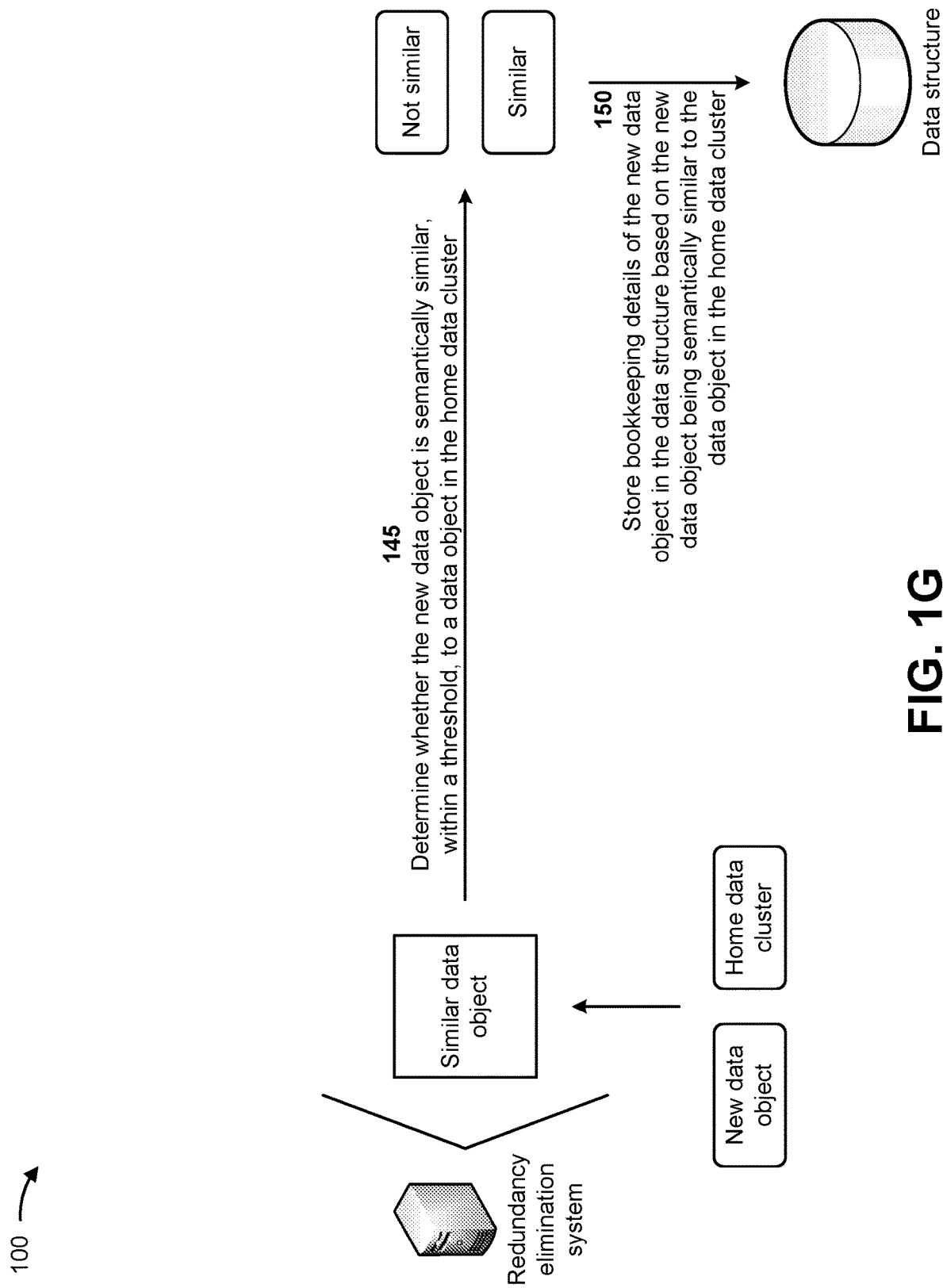

As shown in FIG. 1G, and by reference number 145, the redundancy elimination system may determine whether the new data object is semantically similar, within a threshold, to a data object in the home data cluster. For example, the redundancy elimination system may identify a data object of the home data cluster (e.g., $o_{id} \in$ home($o_{new}$)) that is semantically most proximate to the new data object ($o_{new}$) by searching through the sorted list of data objects in the home data cluster using a sorting parameter (e.g., size of the text), as follows:

$o_{id}$:semCh($o_{id}, o_{new}$)=$\min_{o \in home(o_{new})}$semCh($o, o_{new}$).

The redundancy elimination system may determine whether the data object ($o_{id}$) in the home data cluster is semantically identical to the new data object ($o_{new}$) (e.g., whether a proximity of the data object old and the new data object $o_{new}$ is greater than a predetermined threshold ($\delta_{high} \in 0 \ldots 1$) set by the redundancy elimination system).

As further shown in FIG. 1G, and by reference number 150, the redundancy elimination system may store bookkeeping details of the new data object in the data structure based on the new data object being semantically similar to the data object in the home data cluster. For example, if the redundancy elimination system determines that the data object ($o_{id}$) in the home data cluster is semantically identical to the new data object ($o_{new}$) (e.g., that the proximity of the data object $o_{id}$ and the new data object $o_{new}$ is greater than the predetermined threshold ($\delta_{high} \in 0 \ldots 1$)), the redundancy elimination system may determine that the new data object is redundant and need not be stored in the data structure. The redundancy elimination system may not store the new data object in the data structure but may store bookkeeping details of the new data object in the data structure. The bookkeeping details of the new data object may include a name of the new data object, a size of the new data object, a name of the application that generated the new data object, and/or the like, and may require very little storage space in the data structure relative to the storage space required for the new data object.

Figure 1H:
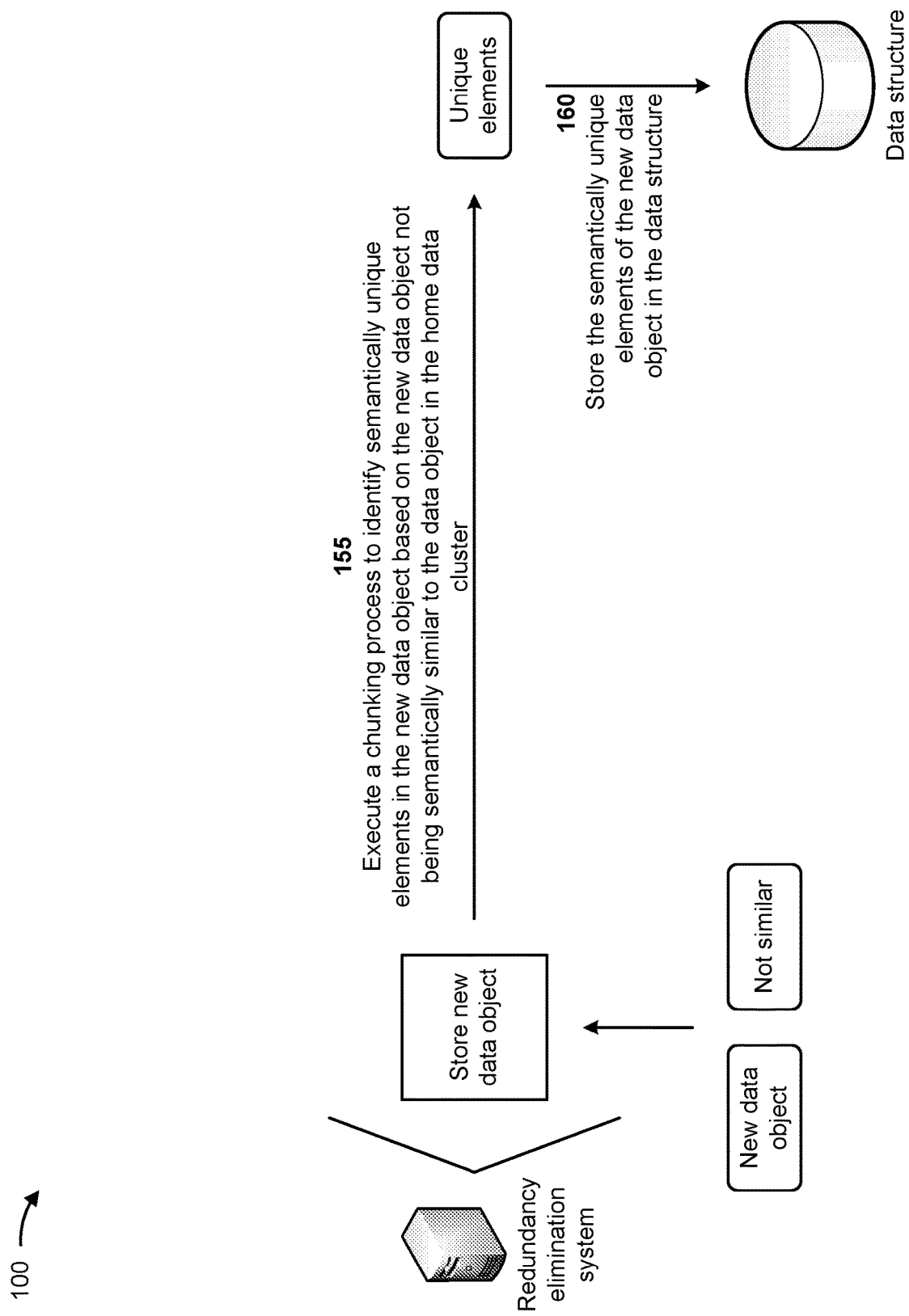

As shown in FIG. 1H, and by reference number 155, the redundancy elimination system may execute a chunking process to identify semantically unique elements in the new data object based on the new data object not being semantically similar to the data object in the home data cluster. For example, if the redundancy elimination system determines that no data object ($o_{id}$) in the home data cluster is semantically identical to the new data object ((mew) (e.g., that the proximity of the data object $o_{id}$ and the new data object (mew is less than or equal to the predetermined threshold ($\delta_{high} \in 0 \ldots 1$)), the redundancy elimination system may determine that the new data object is to be stored in the data structure and may execute the chunking process to identify the semantically unique elements in the new data object. The chunking process may apply a chunker (ch) to the new data object ($o_{new}$) and the data object ($o_{id}$) in the home data cluster to update an element matrix of the data structure: $M_{new}$=ch($o_{new}$)\ch($o_{id}$), where "\" corresponds to a set difference operator. In some implementations, the redundancy elimination system may update the element matrix ($EM_{r \times c}$) as follows:

$EM_{r^+ \times c^+} \leftarrow EM_{r^+ \times c^+}$ $r^+ = r + |M_{new}|$//add new rows for all unique elements in $o_{new}$ $c^+ = c + 1$//add new column $o_{new}$ For each $e \in$ ch($o_{new}$)$\cup$ch($o_{id}$)

$EM_{r^+ \times c^+}[k, c^+]$=Inf($e$)

k≤r is the index for e in the updated matrix
Inf(e) is unique information contained in e
For each $e \in M_{new}$ $EM_{r^+ \times c^+}[k, c^+]$=Inf($e$)

k≥r is the index for e in the updated matrix.

As further shown in FIG. 1H, and by reference number 160, the redundancy elimination system may store the semantically unique elements of the new data object in the data structure. For example, the redundancy elimination system may store the semantically unique elements of the new data object in the data structure based on the new data object not being semantically similar to the data object in the home data cluster. In some implementations, the redundancy elimination system may add the new data object to the home data cluster, and may update a centroid of the home data cluster based on the addition of the new data object to the home data cluster.

In some implementations, the redundancy elimination system may provide computational gain relative to current data storage techniques. For example, a computational gain ($gain_{comp}$) when a new object is received may be provided by:

$$gain_{comp} = \frac{\Sigma n_i * |DB(o_i)|}{\delta + \Sigma w_i * |\text{home}(o_i)|},$$

where $|DB(o_i)|$ is a size of the data structure when the new object ($o_i$) arrives, $|\text{home}(o_i)|$ is a size of a home data cluster for the new object, $\delta$ is a computation required for initial clustering, centroid estimation, and sorting, $n_i$ is a fraction of the data structure evaluated before detecting a duplicate, and $w_i$ is a fraction of the home data cluster evaluated before detecting a duplicate. If $DB(o_1), \ldots, DB(o_i)$, at the time when new objects are received, are $\wp \geq 1$ times larger than home data clusters of o1, ..., oi, the computational gain may be approximated as: $gain_{comp} \geq \wp$ or $(\wp-1)*100\%$. In some implementations, a corresponding energy gain for the process of redundancy elimination in the data structure is $gain_{energy} = cf_c * gain_{comp}$, where $cf_c$ is a conversion factor for execution of unit computation (e.g., a quantity of carbon dioxide emitted on executing one unit of computation, such as a CPU cycle).

In this way, the redundancy elimination system provides energy efficient dynamic redundancy elimination for stored data. The redundancy elimination system may dynamically identify semantically redundant data objects as the data objects are generated and are received for storage. By efficiently identifying redundancies in the data object, the redundancy elimination system may provide energy cost savings by a factor of at least two relative to the current techniques. The redundancy elimination system may identify redundancies in the data objects based on semantic matching at a level of constituent elements of the data objects (e.g., unique phrases in a text document and relative information contained in those phrases). The redundancy elimination system may semantically compress a data structure as an element matrix by storing data objects in terms of constituent elements and information content of the data objects. This, in turn, conserves computing resources, networking resources, and/or the like that would otherwise have been consumed in performing data analytics on large data structures with redundant data, unnecessarily storing large quantities of redundant data in data structures, unnecessarily storing large quantities of useless data in data structures, integrating data in data structures, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
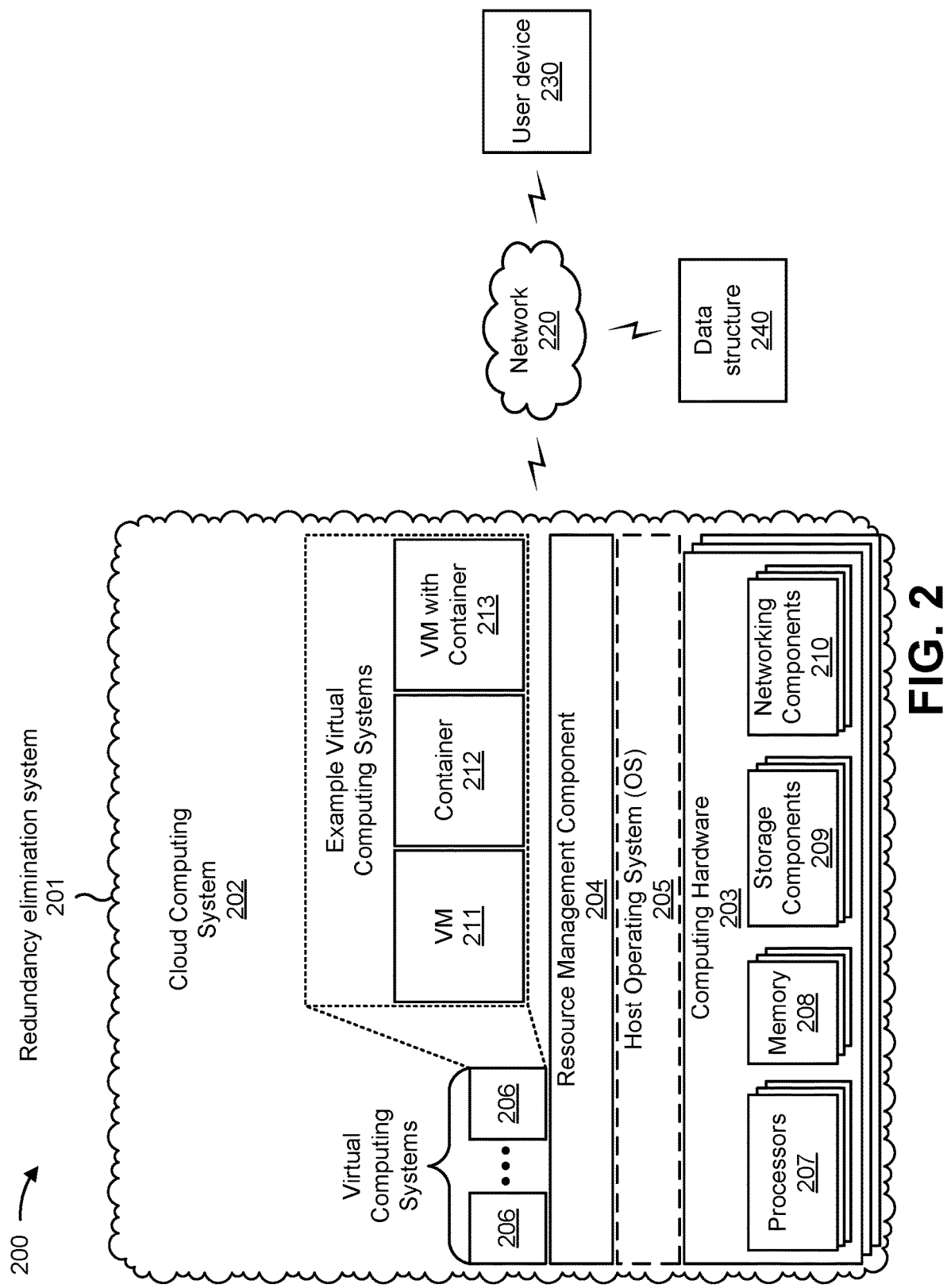
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a redundancy elimination system 201, which may include one or more elements of and/or may execute within a cloud computing system 202. The cloud computing system 202 may include one or more elements 203-213, as described in more detail below. As further shown in FIG. 2, the environment 200 may include a network 220, a user device 230, and/or a data structure 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the redundancy elimination system 201 may include one or more elements 203-213 of the cloud computing system 202, may execute within the cloud computing system 202, and/or may be hosted within the cloud computing system 202, in some implementations, the redundancy elimination system 201 may not be cloud-based (e.g., may be implemented outside of a cloud computing system) or may be partially cloud-based. For example, the redundancy elimination system 201 may include one or more devices that are not part of the cloud computing system 202, such as a device 300 of FIG. 3, which may include a standalone server or another type of computing device. The redundancy elimination system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The user device 230 includes one or more devices capable of receiving, generating, storing, processing, and/or providing information, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The data structure 240 includes one or more devices capable of receiving, generating, storing, processing, and/or providing information, as described elsewhere herein. The data structure 240 may include a communication device and/or a computing device. For example, the data structure 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 240 may communicate with one or more other devices of the environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
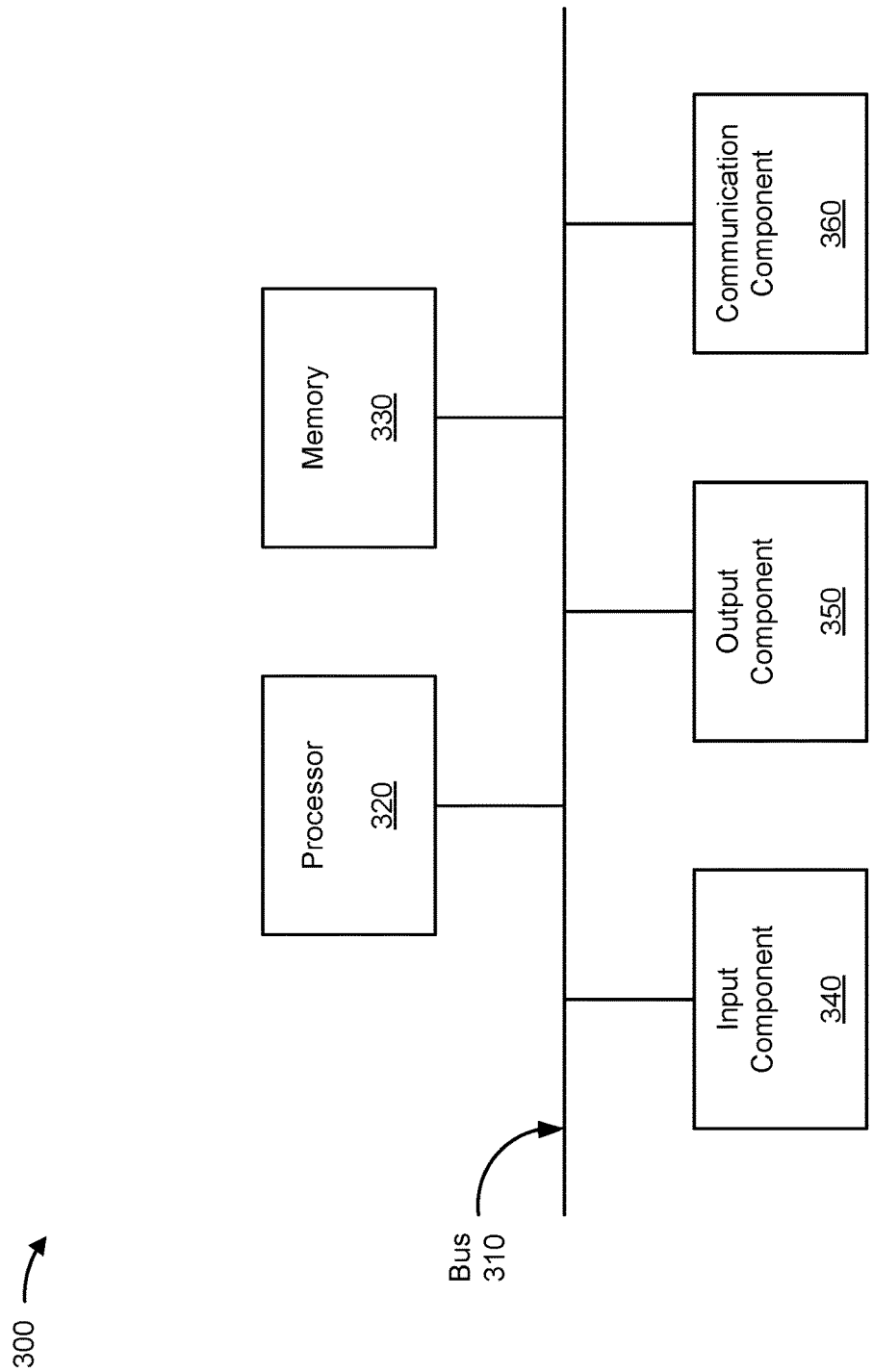
FIG. 3 is a diagram of example components of one or more devices of FIG. 2.

FIG. 3 is a diagram of example components of a device 300, which may correspond to the redundancy elimination system 201, the user device 230, and/or the data structure 240. In some implementations, the redundancy elimination system 201, the user device 230, and/or the data structure 240 may include one or more devices 300 and/or one or more components of the device 300. As shown in FIG. 3, the device 300 may include a bus 310, a processor 320, a memory 330, an input component 340, an output component 350, and a communication component 360.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The input component 340 enables the device 300 to receive input, such as user input and/or sensed inputs. For example, the input component 340 may include a touch screen, a keyboard, a keypad, a mouse, a button, a microphone, a switch, a sensor, a global positioning system component, an accelerometer, a gyroscope, an actuator, and/or the like. The output component 350 enables the device 300 to provide output, such as via a display, a speaker, and/or one or more light-emitting diodes. The communication component 360 enables the device 300 to communicate with other devices, such as via a wired connection and/or a wireless connection. For example, the communication component 360 may include a receiver, a transmitter, a transceiver, a modem, a network interface card, an antenna, and/or the like.

The device 300 may perform one or more processes described herein. For example, a non-transitory computer-readable medium (e.g., the memory 330) may store a set of instructions (e.g., one or more instructions, code, software code, program code, and/or the like) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for providing energy efficient dynamic redundancy elimination for stored data. In some implementations, one or more process blocks of FIG. 4 may be performed by a device (e.g., the redundancy elimination system 201). In some implementations, one or more process blocks of FIG. 4 may be performed by another device or a group of devices separate from or including the device, such as a user device (e.g., the user device 230). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving data objects from an object corpus stored in a data structure (block 405). For example, the device may receive data objects from an object corpus stored in a data structure, as described above.

As further shown in FIG. 4, process 400 may include identifying unique segments within the data objects as elements (block 410). For example, the device may identify unique segments within the data objects as elements, as described above. In some implementations, the elements include one or more of words or phrases for data objects that are text documents, identifying objects for data objects that are images, fields for data objects that are records, sounding patterns for data objects that are audio files, or elements in a schema for data objects that are complex data types.

As further shown in FIG. 4, process 400 may include replacing all equivalent segments with one representative segment (block 415). For example, the device may replace all equivalent segments with one representative segment, as described above.

As further shown in FIG. 4, process 400 may include generating an embedding space based on unique elements and mappings of the data objects to embeddings (block 420). For example, the device may generate an embedding space based on unique elements and mappings of the data objects to embeddings, as described above. In some implementations, generating the embedding space based on the unique elements and the mappings of the data objects to the embeddings includes estimating an information theoretic significance for each element within each data object with respect to the object corpus, building embeddings of the unique elements within the object corpus, transforming each embedding based on an information theoretic significance associated with each embedding, and mapping the data objects to the embeddings to generate the embedding space.

As further shown in FIG. 4, process 400 may include estimating semantic proximities among the data objects based on the mappings of the data objects to the embeddings (block 425). For example, the device may estimate semantic proximities among the data objects based on the mappings of the data objects to the embeddings, as described above. In some implementations, estimating the semantic proximities among the data objects based on the mappings of the data objects to the embeddings includes one or more of estimating semantic proximities among numeric data objects based on absolute differences between values of the numeric data objects, estimating semantic proximities among categorical data objects based on differences between categories of the categorical data objects, or estimating semantic proximities among composite data objects based on absolute differences between values of the composite data objects and based on differences between categories of the composite data objects.

As further shown in FIG. 4, process 400 may include building a semantic cohesion network among the data objects based on the semantic proximities among the data objects (block 430). For example, the device may build a semantic cohesion network among the data objects based on the semantic proximities among the data objects, as described above. In some implementations, the semantic cohesion network includes a set of nodes corresponding to the data objects, links between the set of nodes that are based on the semantic proximities among the data objects, and weights associated with the links.

As further shown in FIG. 4, process 400 may include identifying semantically cohesive data clusters in the semantic cohesion network (block 435). For example, the device may identify semantically cohesive data clusters in the semantic cohesion network, as described above. In some implementations, identifying semantically cohesive data clusters in the semantic cohesion network includes identifying maximal groups of data objects, wherein data objects within each of the maximal groups are semantically cohesively connected together, and wherein the maximal groups of data objects correspond to the semantically cohesive data clusters in the semantic cohesion network.

As further shown in FIG. 4, process 400 may include sorting the data objects in the semantically cohesive data clusters to generate semantically cohesive and sorted data clusters (block 440). For example, the device may sort the data objects in the semantically cohesive data clusters to generate semantically cohesive and sorted data clusters, as described above. In some implementations, sorting the data objects in the semantically cohesive data clusters to generate the semantically cohesive and sorted data clusters includes sorting the data objects in the semantically cohesive data clusters, based on a quantity of distinct constituent elements of the data objects in the semantically cohesive data clusters, to generate the semantically cohesive and sorted data clusters.

As further shown in FIG. 4, process 400 may include receiving a new data object (block 445). For example, the device may receive a new data object, as described above.

As further shown in FIG. 4, process 400 may include determining, from the semantically cohesive and sorted data clusters, a home data cluster for the new data object (block 450). For example, the device may determine, from the semantically cohesive and sorted data clusters, a home data cluster for the new data object, as described above. In some implementations, determining, from the semantically cohesive and sorted data clusters, the home data cluster for the new data object includes determining the home data cluster for the new data object based on a maximum proximity of the home data cluster with the new data object.

In some implementations, determining, from the semantically cohesive and sorted data clusters, the home data cluster for the new data object includes determining cluster centroids of the semantically cohesive and sorted data clusters, and determining the home data cluster for the new data object based on the cluster centroids.

As further shown in FIG. 4, process 400 may include determining whether the new data object is semantically similar, within a threshold, to a data object in the home data cluster (block 455). For example, the device may determine whether the new data object is semantically similar, within a threshold, to a data object in the home data cluster, as described above. In some implementations, determining whether the new data object is semantically similar, within the threshold, to the data object in the home data cluster includes identifying, as the data object in the home data cluster, a data object that is most semantically proximate to the new data object, and determining whether the data object that is most semantically proximate to the new data object satisfies the threshold.

As further shown in FIG. 4, process 400 may include storing bookkeeping details of the new data object in the data structure based on the new data object being semantically similar to the data object in the home data cluster (block 460). For example, the device may store bookkeeping details of the new data object in the data structure based on the new data object being semantically similar to the data object in the home data cluster, as described above.

In some implementations, process 400 includes executing a chunking process to identify semantically unique elements in the new data object based on the new data object not being semantically similar to the data object in the home data cluster, and storing the semantically unique elements of the new data object in the data structure. In some implementations, process 400 includes adding the new data object to the home data cluster, and updating a centroid of the home data cluster. In some implementations, process 400 includes preventing the new data object from being stored in the data structure based on the new data object being semantically similar to the data object in the home data cluster.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, data objects from an object corpus stored in a data structure;
   identifying, by the device, unique segments within the data objects as elements;
   replacing, by the device, all equivalent segments with one representative segment;
   generating, by the device, an embedding space based on unique elements and mappings of the data objects to embeddings;
   estimating, by the device, semantic proximities among the data objects based on the mappings of the data objects to the embeddings;
   building, by the device, a semantic cohesion network among the data objects based on the semantic proximities among the data objects;
   identifying, by the device, semantically cohesive data clusters in the semantic cohesion network;
   sorting, by the device, the data objects in the semantically cohesive data clusters to generate semantically cohesive and sorted data clusters;
   receiving, by the device, a new data object;
   determining, by the device and from the semantically cohesive and sorted data clusters, a home data cluster for the new data object;
   determining, by the device, a semantic relationship between the new data object and a data object in the home data cluster; and
   storing, by the device, bookkeeping details of the new data object in the data structure based on the semantic relationship between the new data object and the data object in the home data cluster.

2. The method of claim 1, further comprising:
   executing a chunking process to identify semantically unique elements in the new data object based on the semantic relationship between the new data object and the data object in the home data cluster; and
   storing the semantically unique elements of the new data object in the data structure.

3. The method of claim 2, further comprising:
   adding the new data object to the home data cluster; and
   updating a centroid of the home data cluster.

4. The method of claim 1, wherein the elements include one or more of:
   words or phrases for data objects that are text documents,
   identified objects for data objects that are images,
   fields for data objects that are records,
   sound patterns for data objects that are audio files, or constituent elements in a schema for data objects that are complex data types.

5. The method of claim 1, wherein generating the embedding space based on the unique elements and the mappings of the data objects to the embeddings comprises:
   estimating an information theoretic significance for each element within each data object with respect to the object corpus;
   building embeddings of the unique elements within the object corpus;
   transforming each embedding based on an information theoretic significance associated with each embedding; and
   mapping the data objects to the embeddings to generate the embedding space.

6. The method of claim 1, wherein estimating the semantic proximities among the data objects based on the mappings of the data objects to the embeddings comprises one or more of:
   estimating semantic proximities among numeric data objects based on absolute differences between values of the numeric data objects;
   estimating semantic proximities among categorical data objects based on differences between categories of the categorical data objects; or
   estimating semantic proximities among composite data objects based on absolute differences between values of the composite data objects and based on differences between categories of the composite data objects.

7. The method of claim 1, wherein the semantic cohesion network includes:
   a set of nodes corresponding to the data objects,
   links between the set of nodes that are based on the semantic proximities among the data objects, and
   weights associated with the links.

8. A device, comprising:
   one or more memories; and
   one or more processors, coupled to the one or more memories, configured to:
      receive data objects from an object corpus stored in a data structure;
      identify unique segments within the data objects as elements;
      replace all equivalent segments with one representative segment;
      generate an embedding space based on unique elements and mappings of the data objects to embeddings;
      estimate semantic proximities among the data objects based on the mappings of the data objects to the embeddings;
      build a semantic cohesion network among the data objects based on the semantic proximities among the data objects,
         wherein the semantic cohesion network includes:
            a set of nodes corresponding to the data objects,
            links between the set of nodes that are based on the semantic proximities among the data objects, and
            weights associated with the links;
      identify semantically cohesive data clusters in the semantic cohesion network;
      sort the data objects in the semantically cohesive data clusters to generate semantically cohesive and sorted data clusters;
      receive a new data object;
      determine, from the semantically cohesive and sorted data clusters, a home data cluster for the new data object;
      determine a semantic relationship between the new data object and a data object in the home data cluster; and
      store bookkeeping details of the new data object in the data structure based on the semantic relationship between the new data object and the data object in the home data cluster.

9. The device of claim 8, wherein the one or more processors, to identify semantically cohesive data clusters in the semantic cohesion network, are configured to:
   identify maximal groups of data objects,
      wherein data objects within each of the maximal groups are semantically cohesively connected together, and
      wherein the maximal groups of data objects correspond to the semantically cohesive data clusters in the semantic cohesion network.

10. The device of claim 8, wherein the one or more processors, to sort the data objects in the semantically cohesive data clusters to generate the semantically cohesive and sorted data clusters, are configured to:
    sort the data objects in the semantically cohesive data clusters, based on a quantity of distinct constituent elements of the data objects in the semantically cohesive data clusters, to generate the semantically cohesive and sorted data clusters.

11. The device of claim 8, wherein the one or more processors, to determine, from the semantically cohesive and sorted data clusters, the home data cluster for the new data object, are configured to:
    determine the home data cluster for the new data object based on a maximum proximity of the home data cluster with the new data object.

12. The device of claim 8, wherein the one or more processors, to determine, from the semantically cohesive and sorted data clusters, the home data cluster for the new data object, are configured to:
    determine cluster centroids of the semantically cohesive and sorted data clusters; and
    determine the home data cluster for the new data object based on the cluster centroids.

13. The device of claim 8, wherein the one or more processors, to determine the semantic relationship between the new data object and the data object in the home data cluster, are configured to:
    identify, as the data object in the home data cluster, a data object that is most semantically proximate to the new data object; and
    determine whether the data object that is most semantically proximate to the new data object satisfies a threshold.

14. The device of claim 8, wherein the one or more processors are further configured to:
    prevent the new data object from being stored in the data structure based on the semantic relationship between the new data object and the data object in the home data cluster.

15. A non-transitory computer-readable medium storing a set of instructions, the set of instructions comprising:
    one or more instructions that, when executed by one or more processors of a device, cause the device to:
       receive data objects from an object corpus stored in a data structure;
       identify unique segments within the data objects as elements;

replace all equivalent segments with one representative segment;
generate an embedding space based on unique elements and mappings of the data objects to embeddings;
estimate semantic proximities among the data objects based on the mappings of the data objects to the embeddings;
build a semantic cohesion network among the data objects based on the semantic proximities among the data objects;
identify semantically cohesive data clusters in the semantic cohesion network;
sort the data objects in the semantically cohesive data clusters to generate semantically cohesive and sorted data clusters;
receive a new data object;
determine, from the semantically cohesive and sorted data clusters, a home data cluster for the new data object;
determine a semantic relationship between the new data object and a data object in the home data cluster; and
selectively:
store bookkeeping details of the new data object in the data structure based on the semantic relationship between the new data object and the data object in the home data cluster; or
prevent the new data object from being stored in the data structure based on the semantic relationship between the new data object and the data object in the home data cluster.

16. The non-transitory computer-readable medium of claim 15, wherein the one or more instructions further cause the device to:
execute a chunking process to identify semantically unique elements in the new data object based on the semantic relationship between the new data object and the data object in the home data cluster;
store the semantically unique elements of the new data object in the data structure;
add the new data object to the home data cluster; and
update a centroid of the home data cluster.

17. The non-transitory computer-readable medium of claim 15, wherein the one or more instructions, that cause the device to generate the embedding space based on the unique elements and the mappings of the data objects to the embeddings, cause the device to:
estimate an information theoretic significance for each element within each data object with respect to the object corpus;
build embeddings of the unique elements within the object corpus;
transform each embedding based on an information theoretic significance associated with each embedding; and
map the data objects to the embeddings to generate the embedding space.

18. The non-transitory computer-readable medium of claim 15, wherein the one or more instructions, that cause the device to estimate the semantic proximities among the data objects based on the mappings of the data objects to the embeddings, cause the device to:
estimate semantic proximities among numeric data objects based on absolute differences between values of the numeric data objects;
estimate semantic proximities among categorical data objects based on differences between categories of the categorical data objects; or
estimate semantic proximities among composite data objects based on absolute differences between values of the composite data objects and based on differences between categories of the composite data objects.

19. The non-transitory computer-readable medium of claim 15, wherein the one or more instructions, that cause the device to sort the data objects in the semantically cohesive data clusters to generate the semantically cohesive and sorted data clusters, cause the device to:
sort the data objects in the semantically cohesive data clusters, based on a quantity of distinct constituent elements of the data objects in the semantically cohesive data clusters, to generate the semantically cohesive and sorted data clusters.

20. The non-transitory computer-readable medium of claim 15, wherein the one or more instructions, that cause the device to determine, from the semantically cohesive and sorted data clusters, the home data cluster for the new data object, cause the device to:
determine cluster centroids of the semantically cohesive and sorted data clusters; and
determine the home data cluster for the new data object based on the cluster centroids.

\* \* \* \* \*